(12) United States Patent
Dierksmeier (10) Patent No.: US 9,771,870 B2
(45) Date of Patent: Sep. 26, 2017

(54) SEALING FEATURES FOR A GAS TURBINE ENGINE

(71) Applicant: Rolls-Royce North American Technologies, Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 297 days.

(21) Appl. No.: 14/635,552

(22) Filed: Mar. 2, 2015

(65) Prior Publication Data

US 2016/0010560 A1    Jan. 14, 2016

Related U.S. Application Data

(60) Provisional application No. 61/947,644, filed on Mar. 4, 2014.

(51) Int. Cl.
| | | |
|---|---|---|
| F01D 5/08 | (2006.01) |
| F02C 7/28 | (2006.01) |
| F01D 5/14 | (2006.01) |
| F01D 5/20 | (2006.01) |
| F01D 5/30 | (2006.01) |
| F01D 11/08 | (2006.01) |
| F01D 11/12 | (2006.01) |
| F01D 11/14 | (2006.01) |
| F01D 11/16 | (2006.01) |
| F01D 11/20 | (2006.01) |
| F01D 11/22 | (2006.01) |

(Continued)

(52) U.S. Cl.
CPC ............... *F02C 7/28* (2013.01); *F01D 5/085* (2013.01); *F01D 5/147* (2013.01); *F01D 5/20* (2013.01); *F01D 5/225* (2013.01); *F01D 5/3007* (2013.01); *F01D 11/001* (2013.01); *F01D 11/006* (2013.01); *F01D 11/08* (2013.01); *F01D 11/12* (2013.01); *F01D 11/14* (2013.01); *F01D 11/16* (2013.01); *F01D 11/20* (2013.01); *F01D 11/22* (2013.01); *F05D 2220/32* (2013.01); *Y02T 50/672* (2013.01); *Y02T 50/676* (2013.01)

(58) Field of Classification Search
None
See application file for complete search history.

(56) References Cited

U.S. PATENT DOCUMENTS 2,160,553 A    5/1939  Pietro
5,344,284 A    9/1994  Delvaux
(Continued)

FOREIGN PATENT DOCUMENTS

DE   102004050739 A1 * 4/2006 ............... F01D 5/20
JP         1113404 A      9/1982

OTHER PUBLICATIONS

Extended European Search Report for EP Application Serial No. 15157435.7, dated Jul. 10, 2015, (5 Pages).

*Primary Examiner* — Dwayne J White
*Assistant Examiner* — Theodore Ribadeneyra
(74) *Attorney, Agent, or Firm* — Barnes & Thornburg LLP (57) ABSTRACT

A blade for a gas turbine engine includes a fixed length member and a floating blade seal that is movable relative to the floating blade seal to change the length of the blade and vary the gap between the blade and an engine housing component.

20 Claims, 6 Drawing Sheets

(51) Int. Cl.
 *F01D 11/00* (2006.01)
 *F01D 5/22* (2006.01)

(56) References Cited

U.S. PATENT DOCUMENTS

| | | | |
|---|---|---|---|
| 5,456,576 | A | 10/1995 | Lyon et al. |
| 6,206,642 | B1 | 3/2001 | Matheny et al. |
| 6,893,226 | B2 | 5/2005 | Phipps |
| 6,966,755 | B2 | 11/2005 | Garner |
| 6,976,824 | B2 | 12/2005 | Nottin |
| 7,549,841 | B1* | 6/2009 | Marussich ............. F01D 11/12 415/173.3 |
| 8,011,883 | B2 | 9/2011 | Schwarz et al. |
| 8,152,466 | B2* | 4/2012 | Gandhi .................. B64C 27/46 416/88 |
| 8,540,487 | B2 | 9/2013 | Bottome et al. |
| 2005/0175447 | A1* | 8/2005 | Garner ..................... F01D 5/20 415/173.3 |
| 2011/0268561 | A1* | 11/2011 | Blanchard .............. F01D 5/282 415/174.4 |
| 2012/0134786 | A1* | 5/2012 | Cairo .................. F04D 29/023 415/173.4 |
| 2013/0168927 | A1* | 7/2013 | Simpson .............. F01D 11/001 277/414 |
| 2013/0195633 | A1* | 8/2013 | Hildebrand .............. F01D 5/20 415/173.4 |

\* cited by examiner

SEALING FEATURES FOR A GAS TURBINE ENGINE

This application claims priority to and the benefit of U.S. Provisional Patent Application No. 61/947,644, filed 4 Mar. 2014, the disclosure of which is now incorporated herein by reference.

FIELD OF THE DISCLOSURE

The present disclosure relates generally to gas turbine engines, and more specifically to sealing features used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Turbines typically include alternating stages of static vane assemblies and rotating wheel assemblies. The rotating wheel assemblies include disks carrying blades that are coupled to the disks. When the rotating wheel assemblies turn, tips of the blades move along blade tracks included in static shrouds that are supported around the rotating wheel assemblies.

Interest in improving efficiency and reducing emissions of gas turbine engines is driving demand for closer tolerances in the operation of gas turbine engines. For example, the efficiency of a gas turbine engine is improved when flow paths that allow combustion products to pass through the engine without having work extracted from the combustion products is reduced. One area where combustion products can pass without having work extracted is between the blades and surrounding blade tracks.

SUMMARY

The present disclosure may comprise one or more of the following features and combinations thereof.

A blade for a gas turbine engine comprises a body and a floating blade seal. The body includes a root configured to engage a turbine rotor, an airfoil extending from the root, and a receiver positioned distally from the root. The floating blade seal is received in the receiver such that centrifugal force applied to the floating blade seal during rotation of the blade about an axis of rotation causes the floating blade seal to move relative to the body and seat against the receiver to extend a radial height of the blade.

In some embodiments, the receiver defines a channel having a first width at a base of the receiver and a second width at an apex of the receiver, the base positioned closer to the root than the apex, the first width greater than the second width.

In some embodiments, the receiver has first and second surfaces that extend between the base and the apex, the first and second surfaces converging from the base to the apex.

In some embodiments, the floating blade seal has a base having a first width and at least two surfaces converging from the base, the width of the floating blade seal decreasing from the base to an apex to define a blade seal edge.

In some embodiments, the floating blade seal comprises a prismatic structure that has a quadrilateral cross-sectional shape with a base and two converging sides that intersect a top.

In some embodiments, the upper surface of the prismatic structure intersects the first side surface to form an edge that extends along a length of the prismatic structure.

In some embodiments, the floating blade seal is free to move relative to the receiver.

In some embodiments, the floating blade seal is free to move relative to the receiver.

In some embodiments, the body defines a flow path extending from the root to the receiver, the flow path configured to direct a flow of gas through the body to impart the flow on the floating blade seal.

A turbine section for use in a gas turbine engine comprises a turbine case, a turbine rotor, and at least one blade. The turbine case includes a housing and a plurality of blade tracks arranged about an inner periphery of the housing around a rotational axis. The turbine rotor comprises a plurality of turbine wheel assemblies mounted in the turbine case to rotate about the rotation axis. Each turbine wheel assembly includes a hub and a plurality of blades secured about the periphery of the hub. The at least one blade has a first portion fixed to the rotor and a second portion moveable relative to the first portion to vary the radial height of the blade during rotation of the turbine rotor.

In some embodiments, the turbine section further comprises a housing and a blade track positioned about an inner periphery of the housing and aligned with the at least one turbine wheel such that the second portion of the at least one blade is positioned adjacent the blade track and spaced apart from the blade track by a variable gap.

In some embodiments, the length of the at least one blade extends as a result of the centrifugal force applied to the second portion as the rotor rotates.

In some embodiments, contact between the second portion and the blade track causes the second portion to be urged toward the rotor to reduce the length of the at least one blade.

In some embodiments, the first portion includes a receiver that constrains movement of the second portion relative to the first portion.

In some embodiments, the length of the at least one blade extends as a result of the centrifugal force applied to the second portion as the rotor rotates.

In some embodiments, the first portion is formed to include a passageway to a cooling gas to flow from the rotor through the first portion and into the receiver.

In some embodiments, the second portion is formed to include an edge that defines the gap, the edge extending parallel to the axis of rotation of the rotor.

A turbine wheel assembly comprises a central hub arranged around a central axis, a plurality of blades secured to the hub, and a floating blade seal. Each blade includes a root engaged with the hub to secure the blade to the hub, an airfoil extending outward radially from the hub, and a shroud extending outward radially from the airfoil that is formed to include a circumferentially-extending receiver channel. The floating blade seal is arranged in the receiver channel of at least one of the shrouds, the floating blade seal movable in the radial direction relative to the shroud.

In some embodiments, the floating blade seal is arranged in the receiver channel of at least two of the shrouds.

In some embodiments, the floating blade seal is arranged in the receiver channel of all the shrouds.

In some embodiments, the floating blade seal includes a plurality of segments that cooperate to extend around substantially the entire circumference of the turbine wheel assembly.

In some embodiments, the receiver channels of each of the plurality of blades is axially aligned along the central axis.

In some embodiments, the receiver channels of each of the plurality of blades cooperate to form a seal channel that extends around substantially the entire circumference of the turbine wheel assembly.

A blade for a gas turbine engine comprises a blade body and a seal structure. The blade body includes a root configured to be coupled to a rotor of a wheel assembly of a gas turbine engine, the blade body configured to rotate about an axis of rotation. The seal structure is cantilevered from the blade body and includes a plurality of receivers positioned in spaced apart relation along the seal structure. Each receiver forms a receiver channel, and a respective floating blade seal is positioned in each receiver channel. Each floating blade seal defines an edge. The respective floating blade seals being movable relative to the receiver to vary the distance of the edge from the axis of rotation when the blade is rotated about the axis of rotation.

In some embodiments, each receiver defines a channel having a first width at a base of the receiver and a second width at an apex of the receiver, the base positioned closer to the root than the apex, the first width greater than the second width.

In some embodiments, each receiver has first and second surfaces that extend between the base and the apex, the first and second surfaces converging from the base to the apex.

In some embodiments, each floating blade seal has a base having a first width and at least two surfaces converging from the base, the width of the floating blade seal decreasing from the base to an apex to define the edge.

In some embodiments, each floating blade seal comprises a prismatic structure that has a quadrilateral cross-sectional shape with a base and two converging sides that intersect a top.

In some embodiments, the upper surface of the prismatic structure intersects the first side surface to form an edge that extends along a length of the prismatic structure.

In some embodiments, each floating blade seal is free to move relative to the receiver.

In some embodiments, each floating blade seal is free to move relative to the receiver.

A seal assembly for a gas turbine engine comprises a runner arranged around a rotational axis of the gas turbine engine, a rotor adapted to move about the rotational axis of the gas turbine engine, the rotor formed to include circumferentially-extending receiver channel opening to face the runner, and a floating seal arranged in the receiver channel of the rotor, the floating seal movable in the radial direction relative to the shroud.

A gas turbine engine comprises a compressor, a combustor, an inner shroud defining a flow path for products of combustion, a turbine, and an output shaft. The turbine comprises a plurality of turbine wheel assemblies, at least one of the turbine wheel assemblies including a rotor that rotates about a rotation axis and a plurality of blades secured about the periphery of the rotor. The blades each have a first portion fixed to the rotor and a second portion moveable relative to the first portion to vary the length of the blade. Each blade further includes a shroud surface that cooperates to form an annular shroud to direct flow through the turbine, and a seal structure cantilevered from the shroud surface. The seal structure includes a plurality of receivers positioned in spaced apart relation along the seal structure, each receiver forming a receiver channel. A respective floating blade seal is positioned in each receiver channel, the respective floating blade seals movable relative to the receiver to vary a gap between the seal structure and the inner shroud to seal the flow path for products of combustion from an inner space in which the rotor is positioned. The output shaft is coupled to the rotor to receive rotational output therefrom.

In some embodiments, the engine further comprises a housing and a blade track positioned about an inner periphery of the housing and aligned with the at least one turbine wheel such that the second portions of the blades are positioned adjacent the blade track and spaced apart from the blade track by a variable gap between each second portion and the blade track.

In some embodiments, the length of each blade extends as a result of the centrifugal force applied to the second portion as the rotor rotates.

In some embodiments, contact between the second portion of a blade and the blade track causes the second portion of the blade to be urged toward the rotor to reduce the length of the blade.

In some embodiments, the first portion includes a receiver that constrains movement of the second portion relative to the first portion.

In some embodiments, the length of the blades extend as a result of the centrifugal force applied to the second portions as the rotor rotates.

In some embodiments, contact between the second portion of a blade and the blade track causes the second portion of the blade to be urged toward the rotor to reduce the length of the blade.

In some embodiments, the first portion of each blade is formed to include a passageway to a cooling gas to flow from the rotor through the first portion and into the receiver.

In some embodiments, the second portion of each blade is formed to include an edge that defines the gap, the edge extending parallel to the axis of rotation of the rotor.

In some embodiments, the second portion of each blade is formed to include an edge that defines the gap, the edge extending parallel to the axis of rotation of the rotor.

A method of sealing a gas turbine engine comprises the steps of providing a gas turbine engine including a blade having a length, and varying the length of the blade to seal a flow path through the turbine engine for products of combustion from an inner space in which the rotor is positioned.

In some embodiments, the gas turbine engine comprises a combustor, an inner shroud defining a flow path for products of combustion, and a turbine comprising a plurality of turbine wheel assemblies, at least one of the turbine wheel assemblies including a rotor that rotates about a rotation axis and a plurality of blades each having a length and being secured about the periphery of the rotor, and varying the length of the blades. Rotation of the blades my vary the length of blades.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
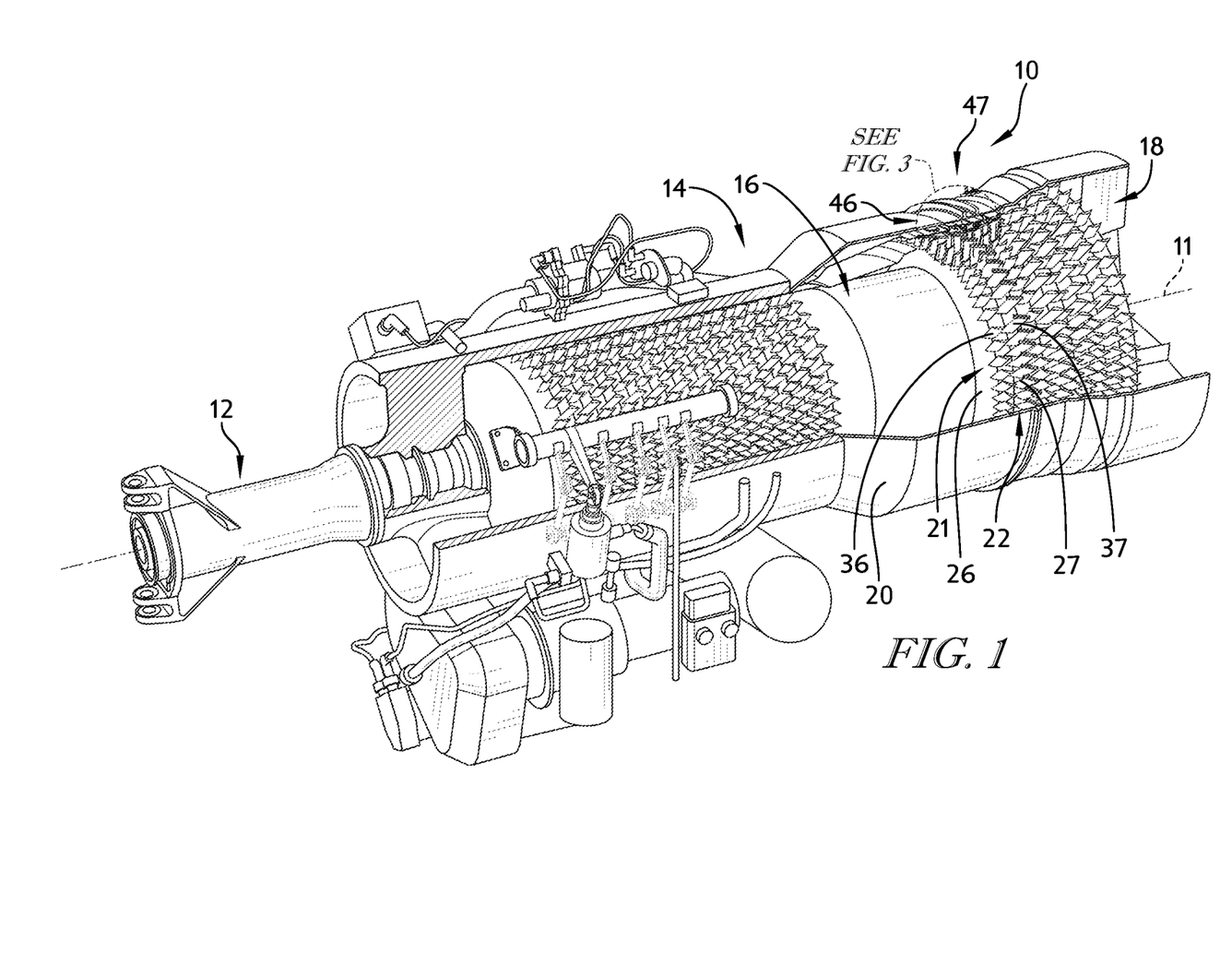
FIG. 1 is a perspective view of a multi-stage turbine power plant with portions cut away to show the arrangement of air foils within the power plant.

FIG. 1 shows an illustrative aerospace gas turbine engine 10 cut-away to show that the engine 10 includes an output shaft 12, a compressor 14, a combustor 16, and a turbine 18 all mounted to a case 20. The output shaft 12 is configured to be coupled to a propeller (not shown) and is driven by the turbine 18. The compressor 14 is configured compress and deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the output shaft 12.

The turbine 18 illustratively includes static turbine vane assemblies 21, 22, etc. and corresponding turbine wheel assemblies 26, 27, etc. as shown in FIG. 1. Each vane assembly 21, 22, etc. includes a plurality corresponding of vanes 31, 32, etc. and each turbine wheel assembly 26, 27, etc. includes a plurality of corresponding blades 36, 37, etc. The vanes 31, 32, etc. of the vane assemblies 21, 22, etc. extend across the flow path of the hot, high-pressure combustion products from the combustor 16 to direct the combustion products toward the blades 36, 37, etc. of the turbine wheel assemblies 26, 27, etc. The blades 36, 37, etc. are in turn pushed by the combustion products to cause the turbine wheel assemblies 26, 27, etc. to rotate; thereby, driving the rotating components of the compressor 14 and the output shaft 12.

The turbine 18 also includes a plurality of turbine shrouds 46, 47, etc. that extend around each turbine wheel assembly 26, 27, etc. to block combustion products from passing over the blades 36, 37, etc. without pushing the blades 36, 37, etc. to rotate. An exemplary first stage turbine shroud 46, shown in FIG. 2, extends around a first stage turbine wheel assembly 26 and is sized to block most combustion products from passing over the blades 36 without pushing the blades 36 to rotate as suggested in FIG. 2. Combustion products that are allowed to pass over the blades 36 do not push the blades 36 and such passed-over products contribute to lost performance within the engine 10.

Figure 2:
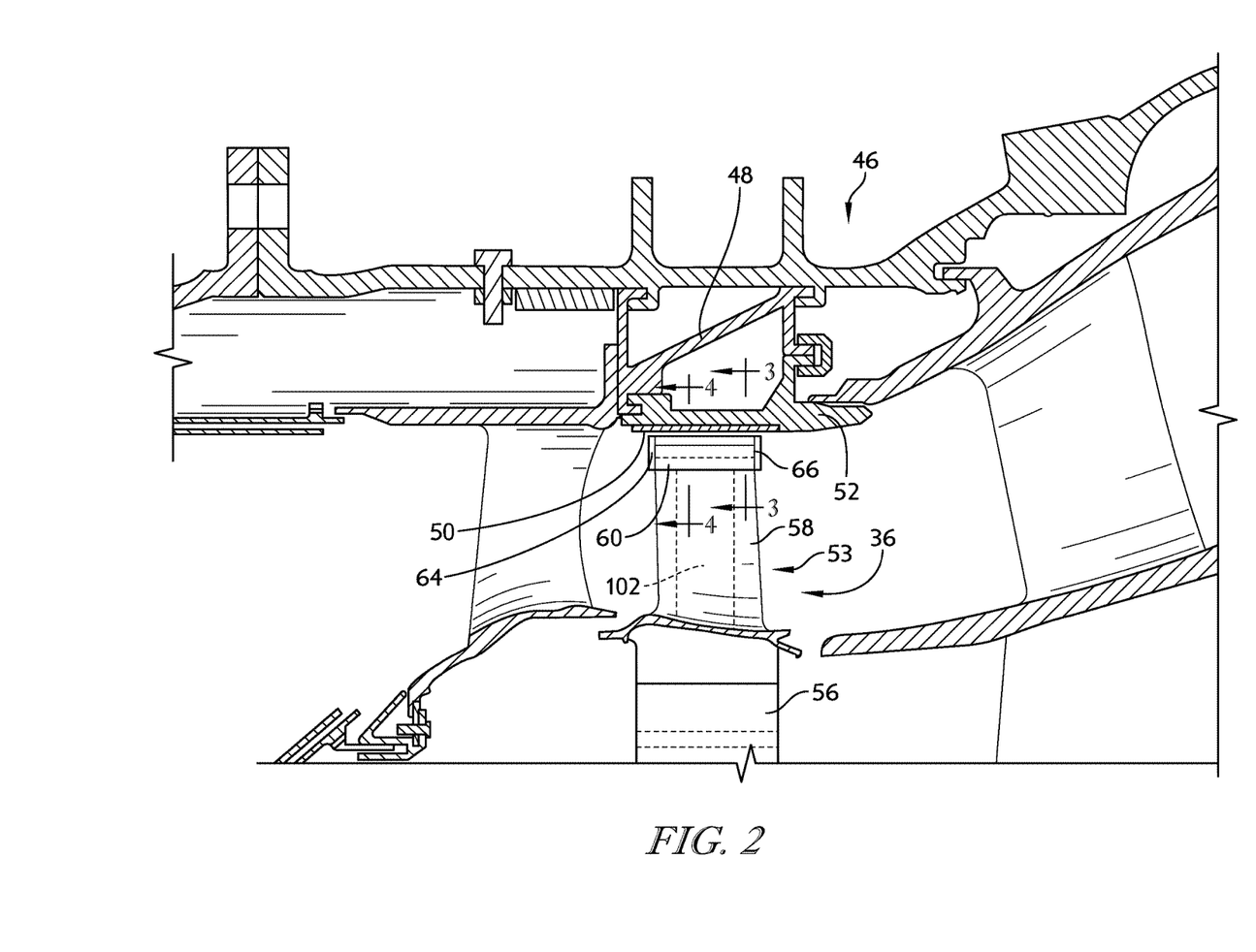
FIG. 2 is a view of the interaction of the floating blade seal of the air foil blade and the abrasive track blade as viewed in a direction perpendicular to the longitudinal rotational axis of the multi-stage turbine power plant while the power plant is operating at steady state, the floating blade seal of the air foil blade being spaced apart from the consumable blade track.

The turbine shroud 46 illustratively includes a carrier 48, a blade track (sometimes called seal ring) 50, and a retainer 52 as shown in FIG. 2. The carrier 48 is an annular, round metallic component and is configured to support the blade track 50 in position adjacent to the blades 36 of the turbine wheel assembly 26. The illustrative blade track 50 is concentric with and nested into the carrier 48 along a rotational axis 11 of the engine 10. The retainer 52 engages both the carrier 48 and the blade track 50 to position the carrier 48 and the blade track relative to other static turbine components.

In the illustrative embodiment, the blade track 50 is made from a ceramic material; and, more particularly, a ceramic matrix composite (CMC). For purposes of this application, a ceramic material is any monolithic ceramic or composite in which at least one constituent is a ceramic. In other embodiments, the blade track 50 may be made of other metallic, non-metallic, or composite materials with low coefficients of thermal expansion.

The blades 36 each include a body 53 and a floating blade seal 54 as shown in FIG. 2. The body 53 includes a root 56 that engages with a turbine wheel (not shown) to secure the blade 36 to the turbine wheel. The body 53 also includes an airfoil surface 58 extending from the root 56 with a receiver 60 positioned distally from the root 56.

Figure 3:
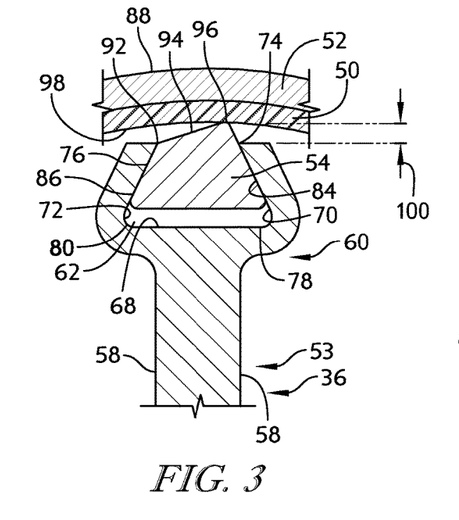
FIG. 3 is a cross-sectional view of a portion of the air foil blade of FIG. 2 taken along lines 3-3 of FIG. 2.
Figure 4:
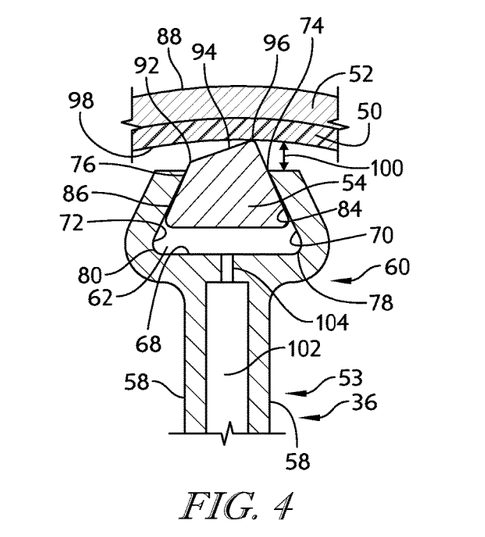
FIG. 4 is a cross-sectional view of a portion of the air foil blade of FIG. 2 taken along lines 4-4 of FIG. 2.
Figure 5:
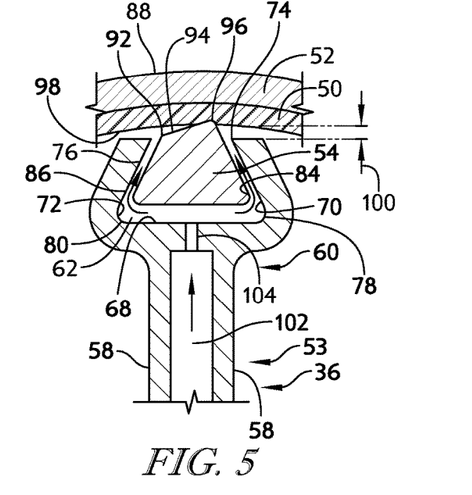
FIG. 5 is a cross-sectional view similar to FIG. 4, the cross-sectional view of FIG. 5 illustrating the operation of the air foil blade in a transient condition such that the floating blade seal engages the consumable blade track, the floating blade seal being urged away from the body of the air foil blade such that a flow path for cooling gas to pass through the body of the air foil blade and past the floating blade seal to cool the interface between the floating blade seal and the consumable blade track.

Referring now to FIGS. 3-5, the receiver 60 includes a channel 62 configured to receive the floating blade seal 54 therein. Once the floating blade seal 54 is positioned in the channel 62, two end plates 64, 66 (shown in FIG. 2) are secured to the receiver 60 to capture the floating blade seal 54 in the channel 62. It should be noted that the floating blade seal 54 is free to move relative to receiver 60 as will be described in further detail below. In the illustrative embodiment, the blade body 53, floating blade seal 54, and end plates 64, 66 comprise titanium. The end plates 64, 66 are welded or brazed to the body 53 after the floating blade seal 54 is received into the channel 62.

The channel 62 has a generally frusto-triangular shape in cross-section as shown in FIGS. 3-5. The channel 62 has a base surface 68 and two leg surfaces 70, 72. The leg surfaces 70, 72 terminate such that the frustum of the triangular cross-sectional shape is absent, leaving an open space between the terminations 74, 76 of the respective leg surfaces 70, 72. The leg surfaces 70, 72 each transition to the base surface 68 through respective radius corners 78, 80.

The floating blade seal 54 has a generally triangular cross-sectional shape with a modified frustum as shown in FIGS. 3-5. The floating blade seal 54 has a generally planar base 82 and two generally planar leg surfaces 84, and 86. The leg surface 84 terminates at an edge 88 that appears as a point in FIGS. 3-5, but should be understood to be an elongated contact point that extends along the longitudinal length of the floating blade seal 54. The leg surface 86 terminates at an edge 92 that also extends along the longitudinal length of the floating blade seal 54. Another generally planar surface 94 extends between edge 88 and edge 92.

As shown in FIGS. 3 and 4, the floating blade seal 54 is urged outwardly through centrifugal forces away from the root 56 as the blade 36 rotates about the rotational axis 11 so that the leg surfaces 84 and 86 of the floating blade seal 54 engage the leg surfaces 70 and 72, respectively, of the receiver 60. Effectively, this lengthens the blade 36 to reduce the gap 96 between the edge 88 and the surface 98 of the blade track 50 to reduce the potential for combustion products to pass the blade 36 without acting on the blade 36.

Controlling the gap 96 is a challenge in that the differences in the expansion rates of the blades 36 and the shroud 46 and blade track 50 increase the potential for a fixed length blade, in place of blade 36, to engage the blade track 50 in an interference condition, increasing friction and reducing the efficiency of the engine 10. For example, during a transient condition where the engine 10 is subjected to a large change in throughput of combustion products, the differences may be great enough to cause damage to the shroud 46. However, if the blade is too short, efficiency is lost during normal operation because of the magnitude of gap 96.

Because the floating blade seal 54 is movable relative to the receiver 60, the floating blade seal 54 may be urged away from the blade track 50 during transient events. For example, referring to FIG. 5, when the gap 100 between the receiver 60 and the blade track 50 is reduced as compared to FIG. 4, the floating blade seal 54 engages the blade track 50 and the contact overcomes the centrifugal force acting on the floating blade seal 54 so that the leg surfaces 84 and 86 of the floating blade seal 54 are urged away from the leg surfaces 70 and 72 of the channel 62. The freedom of movement of the floating blade seal 54 relative to the receiver 60 reduces the frictional force imparted to the floating blade seal 54 during rotation of the engine 10, reducing the energy loss due to friction. The floating blade seal 54 will tend to wear into the blade track 50, which is a consumable material, so that the gap 96 is modified during the operation of the engine 10. It is contemplated that the gap 96 will be near zero during normal operation and prior to the engine 10 being "broken-in," thereby allowing the engine operation to optimize the gap 96.

Referring again now to FIG. 2, the blade 36 is formed to include a passageway 102 in the body 53 which extends from the root 56 to the channel 62 of the receiver 60. Referring to the cross sectional view of FIG. 5, it can be seen that the passageway 102 is connected to a second passageway 104 intermediate the passageway 102 and the channel 62. The passageway 102 is in fluid communication with a source of cooling gas that may be selectively actuated to allow the cooling gas to traverse the passageway 102 through the passageway 104 and impinge upon the floating blade seal 54 through the channel 62. In some embodiments, the cooling gas may be selectively applied during transient conditions where the floating blade seal 54 is urged away from the leg surfaces 70, 72 of the receiver 60 so that the cooling gas may pass over portions of the floating blade seal 54. In still other embodiments where there is no need for the application of the cooling gas, the blade body 53 is formed without passageways 102 and 104 so that the blade body 53 is solid.

Figure 6:
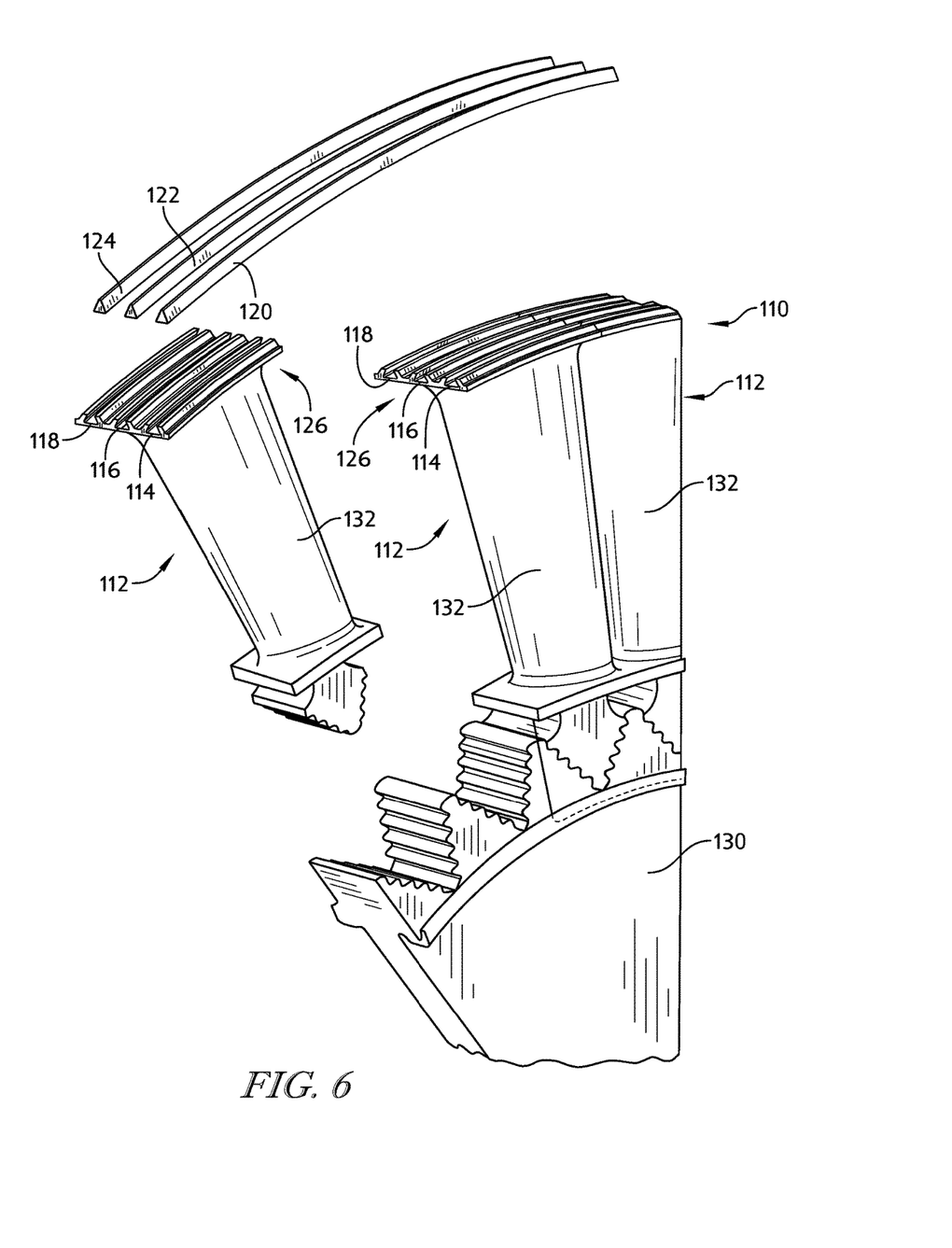
FIG. 6 is a perspective view of an alternative embodiment of a blade assembly with portions removed, the embodiment of FIG. 6 includes multiple floating blade seals positioned transverse to the longitudinal axis of a turbine power plant such that the floating blade seals provide a seal between two portions of the power plant that operate at different pressures.

While the disclosure regarding the embodiments of FIGS. 1-5 are directed to an arrangement of blades 36 that separate stages of the turbine 18 of the engine 10, the floating blade seal is also useful as a seal to separate portions of an engine assembly of differing pressures and thereby assist in controlling flow through an engine assembly. For example, the blade assembly 110 shown in FIG. 6 is configured such that each blade 112 has a plurality of receivers 114, 116, and 118 that receiving respective floating blade seals 120, 122, and 124 in a manner similar to the embodiment of FIGS. 1-5. However, the embodiment of FIG. 6 is arranged such that the blade ends 126 are cantilevered so that the floating blade seals 120, 122, and 124 are spaced away from an air foil surface 132. The receivers 114, 116, and 118 are oriented such that the floating blade seals 120, 122, and 124 are oriented transverse to the axis of rotation so that each floating blade seal 120, 122, and 124 is secured to a group of blades 112 and cooperates with a corresponding floating blade seal 120, 122, and 124 of a group of blades to form an annular seal. The blade assemblies 110 are secured to a rotor disc 130 in a manner similar to that described in U.S. Pat. No. 6,893,226 which is incorporated by reference herein for the disclosure of a suitable manner for securing the blade assembly 110 to the rotor disc 130 or any other rotor structure to which a blade may be secured.

Figure 7:
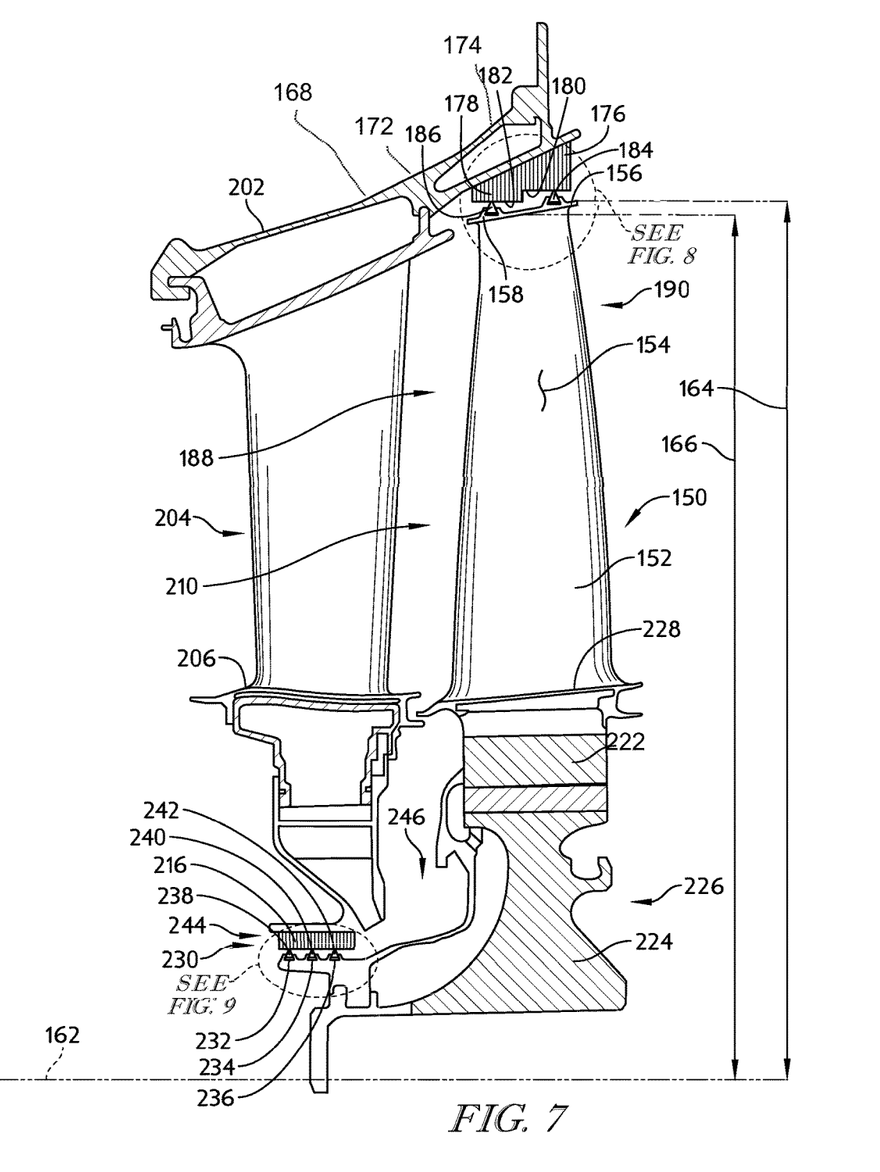
FIG. 7 is a partial cross-sectional view of a low-pressure turbine assembly adapted for use in a gas turbine engine showing a shrouded turbine blade positioned at a change in diameter of a case with a floating blade seals to reduce the bypass of combustion products and a seal assembly including a rotor with floating blade seals mounted to the rotor and engaged with a static runner.
Figure 8:
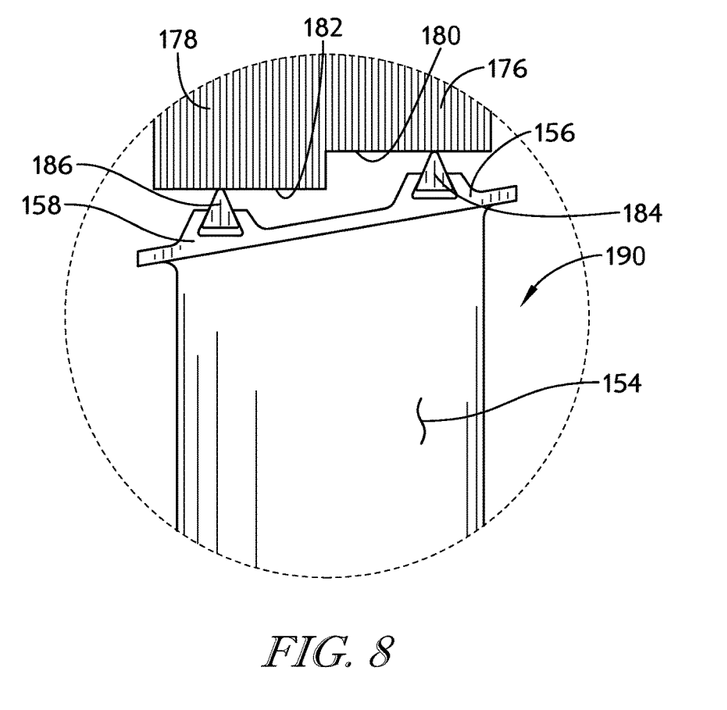
FIG. 8 is an enlarged view of a portion of the partial cross-sectional view of FIG. 7.
Figure 9:
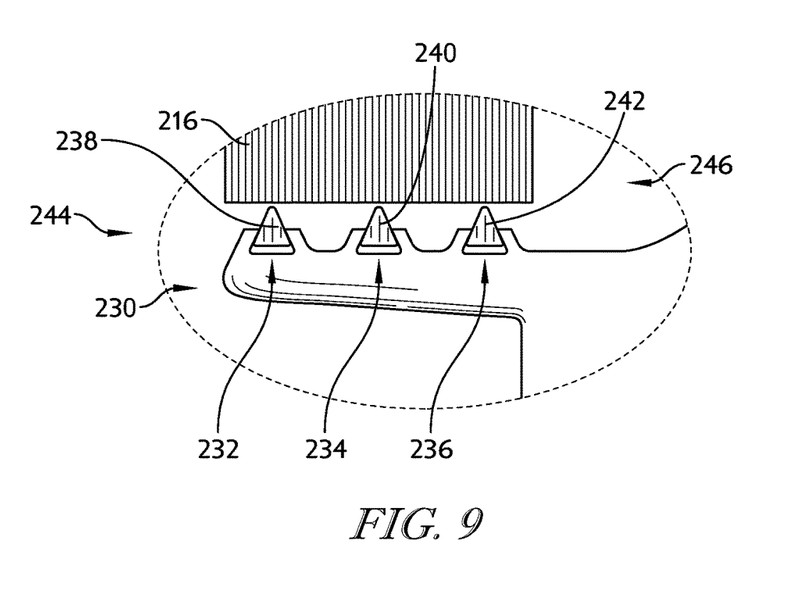
FIG. 9 is an enlarged view of another portion of the partial cross-sectional view of FIG. 7.

In still another embodiment shown in FIG. 7, an arrangement similar to the blade assembly 110 has a plurality of blades 150. Each blade 150 includes a body 152 having an airfoil surface 154. The body 152 also includes a pair of receivers 156, 158 formed on an outer perimeter of the body 152 similar to the manner in which the receivers 114, 116, and 118 are formed on the blade 112 described above. The arrangement of the embodiment of FIG. 7 is such that the receiver 156 is positioned a first distance 160 from an axis of rotation 162 while the receiver 158 is positioned a second distance 164 from the axis of rotation 162. This arrangement allows the blade 150 to be used at a location where the engine housing 168 has a diameter that transitions in size as measured by the change from a first radius 172 to a second radius 174 as measured from the axis of rotation 162. To respective blade tracks 176 and 178 are configured with surfaces 180 and 182 that are cylindrical about the axis of rotation 162. Because the blade tracks 176 and 178 can be formed as annular cylindrical surfaces, the manufacturer of the housing is simplified and less susceptible to variations in manufacturing.

Each of the respective receivers 156 and 158 retain a respective floating blade seal 184 and 186 with the receivers 156 and 158 arranged to capture and retain the floating blade seals 184 and 186 so that their movement relative to the receivers 156 and 158 is perpendicular to the axis of rotation 162. Thus, the floating blade seals 184 and 186 engage the respective blade tracks 176 and 178 to provide a seal between a first side 188 and a second side 190 of the blade 150. This arrangement reduces the susceptibility of gases to bypass the end of the blade 150 without imparting work on the airfoil surface 154. It should be noted that the floating blade seals 184 and 186 of the embodiment of FIG. 7 are arranged so that the floating blade seals 184 and 186 provide a continuous line of annular contact or near contact about the inner surfaces 180 and 182 that is transverse to the axis of rotation 162 as compared to the contact of the floating blade seal 54 of the embodiment of FIGS. 1-5 which is parallel to the longitudinal axis of rotation of the engine 10.

The arrangement of FIG. 7 includes an outer case 202, a static diverter vane 204 extending from the outer case 202 to an inner shroud 206. The space between the outer case 202 and the inner shroud 206 defines a flow path 210 through which combustion products flow to act on an airfoil surface 208 of the blade 150. The blade body 152 includes a root 222 that secures the blade body 152 to a rotor 224 of a drum assembly 226 of the engine 200. The blade body 152 is also formed to include a shroud surface 228 that is a segment of an annular shroud assembly that is formed when multiple blades 212 are assembled to the drum assembly 226. The annular shroud is formed when the shroud surfaces 228 of adjacent blades 212 abut each other to form a surface between the airfoil surfaces 208 of the blades 212. In addition, each blade 150 includes a sealing ring segment 230 that is cantilevered from the root 222 to underlie a portion of the inner shroud 206 a manner similar to that discussed above and engage a runner 216 to form a seal assembly 212. The sealing ring segment 230 is formed to include three receivers 232, 234, and 236 which retain respective floating blade seals 238, 240, 242 which provide a seal to prevent the combustible materials traveling through the flow path 210 from being diverted into an space 244 adjacent the drum assembly 226.

In operation, the pressure of the products of combustion passing through the flow path 210 are higher than the pressure in the space 244. During the expansion of the combustion products through the flow path 210, work is derived when combustion products act on the airfoil surface 154 of the blade 150. The blade 150 provides resistance to the combustion products which, in certain situations, may cause the combustion products to seek a path of less resistance such as through a gap 246 that is formed between the shroud assembly created by the shroud surfaces 228 of adjacent blades 150 and the inner shroud 206. The arrangement of the receivers 232, 234, and 236, and the floating blade seals 238, 240, and 242 reduces the gap 246 in normal operation to reduce the potential for combustion products to be diverted into the space 244, thereby improving the efficiency of the engine 200.

It will be appreciated that a method of increasing the efficiency of a gas turbine engine according to the illustrative embodiments described in the foregoing description is contemplated. Illustratively, a method of sealing a gas turbine engine is disclosed. The illustrative method comprises the steps of providing a gas turbine engine including a blade having a length, and varying the length of the blade to seal a flow path through the turbine engine for products of combustion from an inner space in which the rotor is positioned. The length of the blade may be varied by the step of rotating the blade about an axis of rotation. The blade may have a first portion, for example a root, fixed to or coupled together with the rotor. The blade may have a second portion, for example a seal, moveable relative to the first portion to vary the length or the radial height of the blade.

While it is contemplated in the present disclosure that each floating blade seal that is arranged annular really about a rotation axis, such as the floating blade seals disclosed with regard to the embodiments of FIGS. 9-12, are each positioned in a receiver in a respective blade, other arrangements may also be employed. For example, in some embodiments the floating blade seals will be offset relative to the blades so that each floating blade seal crosses the boundary between two adjacent blades to assist in aligning adjacent blades. In some embodiments, clamp rings may be used to secure adjacent blades to form an annular ring as is known in the art. While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade for a gas turbine engine comprising
a body including a root configured to engage a turbine rotor, an airfoil extending from the root, and a receiver positioned distally from the root, and
a floating blade seal received in the receiver such that centrifugal force applied to the floating blade seal during rotation of the blade about an axis of rotation causes the floating blade seal to move relative to the body and seat against the receiver to extend a radial height of the blade,
wherein the receiver defines a channel having a first width at a base of the receiver and a second width at an apex of the receiver, the base positioned closer to the root than the apex, the first width being greater than the second width, and wherein the receiver has first and second surfaces that extend between the base and the apex, the first and second surfaces converging from the base to the apex.

2. The blade of claim 1, wherein the floating blade seal has a base having a first width and at least two surfaces converging from the base, the width of the floating blade seal decreasing from the base to an apex to define a blade seal edge.

3. The blade of claim 2, wherein the floating blade seal comprises a prismatic structure that has a quadrilateral cross-sectional shape with a base and two converging sides that intersect a top.

4. The blade of claim 3, wherein the upper surface of the prismatic structure intersects the first side surface to form an edge that extends along a length of the prismatic structure.

5. The blade of claim 4, wherein the floating blade seal is free to move relative to the receiver.

6. The blade of claim 1, wherein the floating blade seal is free to move relative to the receiver.

7. The blade of claim 6, wherein the body defines a flow path extending from the root to the receiver, the flow path configured to direct a flow of gas through the body to impart the flow on the floating blade seal.

8. The blade of claim 1, wherein the root is configured to be coupled to the rotor of a wheel assembly of a gas turbine engine, and wherein the floating blade seal comprises a seal structure cantilevered from the blade body, the seal structure including a plurality of receivers positioned in spaced apart relation along the seal structure, each receiver forming a receiver channel, and a respective floating blade seal positioned in each receiver channel, each floating blade seal defining an edge, the respective floating blade seals movable relative to the receiver to vary the distance of the edge from the axis of rotation when the blade is rotated about the axis of rotation.

9. The blade of claim 8
wherein each receiver defines a channel having a first width at a base of the receiver and a second width at an apex of the receiver, the base positioned closer to the root than the apex, the first width greater than the second width;
wherein each receiver has first and second surfaces that extend between the base and the apex, the first and second surfaces converging from the base to the apex;

wherein each floating blade seal has a base having a first width and at least two surfaces converging from the base, the width of the floating blade seal decreasing from the base to an apex to define the edge;

wherein each floating blade seal comprises a prismatic structure that has a quadrilateral cross-sectional shape with a base and two converging sides that intersect a top;

wherein the upper surface of the prismatic structure intersects the first side surface to form an edge that extends along a length of the prismatic structure; and wherein each floating blade seal is free to move relative to the receiver.

10. The blade of claim 1, wherein the floating blade seal comprises a runner arranged around the axis of rotation of the gas turbine engine, wherein the rotor is adapted to move about the axis of rotation of the gas turbine engine, the rotor formed to include circumferentially-extending receiver channel opening to face the runner, and a floating seal arranged in the receiver channel of the rotor, the floating seal movable in the radial direction relative to the shroud.

11. The blade of claim 1, further comprising a turbine wheel assembly including a central hub arranged around the central axis; wherein the blade is secured to the hub, the blade's root being engaged with the hub to secure the blade to the hub and wherein the airfoil extends outward radially from the hub, a shroud extending outward radially from the airfoil that is formed to include a circumferentially-extending receiver channel, wherein the floating blade seal is arranged in the receiver channel of at least one of the shrouds, the floating blade seal movable in the radial direction relative to the shroud.

12. The blade of claim 11 further comprising a plurality of blades secured to the hub, each blade including a root engaged with the hub to secure the blade to the hub, an airfoil extending outward radially from the hub, and a shroud extending outward radially from the airfoil that is formed to include a circumferentially-extending receiver channel, wherein the floating blade seal is arranged in the receiver channel of all of the shrouds, wherein the floating blade seal includes a plurality of segments that cooperate to extend around substantially the entire circumference of the turbine wheel assembly, and wherein the receiver channels of each of the plurality of blades cooperate to form a seal channel that extends around substantially the entire circumference of the turbine wheel assembly.

13. The blade of claim 1 further comprising a turbine section comprising a turbine case including a housing and a plurality of blade tracks arranged about an inner periphery of the housing around the axis of rotation, wherein the turbine rotor includes a plurality of turbine wheel assemblies mounted in the turbine case to rotate about the axis of rotation, each turbine wheel assembly including a hub and a plurality of blades secured about the periphery of the hub, and wherein at least one blade of the plurality of blades includes a first portion fixed to the rotor and a second portion moveable relative to the first portion to vary the radial height of the blade during rotation of the turbine rotor.

14. The blade of claim 13, wherein the turbine section further comprises a housing and a blade track positioned about an inner periphery of the housing and aligned with the at least one turbine wheel such that the second portion of the at least one blade is positioned adjacent the blade track and spaced apart from the blade track by a variable gap, wherein a length of the at least one blade extends as a result of the centrifugal force applied to the second portion as the rotor rotates, wherein contact between the second portion and the blade track causes the second portion to be urged toward the rotor to reduce the length of the at least one blade, wherein the first portion includes a receiver that constrains movement of the second portion relative to the first portion, wherein the length of the at least one blade extends as a result of the centrifugal force applied to the second portion as the rotor rotates, wherein contact between the second portion and the blade track causes the second portion to be urged toward the rotor to reduce the length of the at least one blade, wherein the first portion is formed to include a passageway to a cooling gas to flow from the rotor through the first portion and into the receiver, wherein the second portion is formed to include an edge that defines the gap, the edge extending parallel to the axis of rotation of the rotor, and wherein the second portion is formed to include an edge that defines the gap, the edge extending parallel to the axis of rotation of the rotor.

15. The blade of claim 1 further comprising a gas turbine engine comprising a compressor, a combustor, an inner shroud defining a flow path for products of combustion, a turbine comprising a plurality of turbine wheel assemblies, at least one of the turbine wheel assemblies including the rotor which rotates about the rotation axis and a plurality of blades secured about the periphery of the rotor, the blades each having a length and each having a first portion being fixed to the rotor and a second portion moveable relative to the first portion to vary the length of the blade, each blade further including a shroud surface that cooperates to form an annular shroud to direct flow through the turbine, and a seal structure cantilevered from the shroud surface, the seal structure including a plurality of receivers positioned in spaced apart relation along the seal structure, each receiver forming a receiver channel, and a respective floating blade seal positioned in each receiver channel, the respective floating blade seals movable relative to the receiver to vary a gap between the seal structure and the inner shroud to seal the flow path for products of combustion from an inner space in which the rotor is positioned.

16. The blade of claim 15 further comprising an output shaft, the output shaft coupled to the rotor to receive rotational output therefrom, and wherein the engine further comprises a housing and a blade track positioned about an inner periphery of the housing and aligned with the at least one turbine wheel such that the second portions of the blades are positioned adjacent the blade track and spaced apart from the blade track by a variable gap between each second portion and the blade track, wherein the length of each blade extends as a result of the centrifugal force applied to the second portion as the rotor rotates, wherein contact between the second portion of a blade and the blade track causes the second portion of the blade to be urged toward the rotor to reduce the length of the blade, wherein the first portion includes a receiver that constrains movement of the floating blade seal relative to the first portion, wherein the first portion is formed to include a passageway to a cooling gas to flow from the rotor through the first portion and into the receiver, and wherein the floating blade seal is formed to include an edge that defines the gap, the edge extending parallel to the axis of rotation of the rotor.

17. A gas turbine engine comprising
a compressor,
a combustor,
an inner shroud defining a flow path for products of combustion,
a turbine comprising a plurality of turbine wheel assemblies, at least one of the turbine wheel assemblies including a rotor that rotates about a rotation axis and a plurality of blades secured about the periphery of the rotor, the blades each having a first portion fixed to the rotor and a second portion moveable relative to the first portion to vary the length of the blade, each blade further including a shroud surface that cooperates to form an annular shroud to direct flow through the turbine, and a seal structure cantilevered from the shroud surface, the seal structure including a plurality of receivers positioned in spaced apart relation along the seal structure, each receiver forming a receiver channel, and a respective floating blade seal positioned in each receiver channel, the respective floating blade seals movable relative to the receiver to vary a gap between the seal structure and the inner shroud to seal the flow path for products of combustion from an inner space in which the rotor is positioned, wherein each of the plurality of receivers defines a channel having a first width at a base of the receiver and a second width at an apex of the receiver, the base positioned closer to the rotor than the apex, the first width being greater than the second width, and wherein each of the plurality of receivers has first and second surfaces that extend between the base and the apex, the first and second surfaces converging from the base to the apex, and an output shaft, the output shaft coupled to the rotor to receive rotational output therefrom.

18. A method of sealing a gas turbine engine comprising the steps of:
providing a gas turbine engine including a combustor, an inner shroud defining a flow path for products of combustion, and a turbine comprising a plurality of turbine wheel assemblies, at least one of the turbine wheel assemblies including a rotor that rotates about a rotation axis and a plurality of blades each having a length and being secured about the periphery of the rotor, and varying the length of the blades to seal a flow path through the turbine engine for products of combustion from an inner space in which the rotor is positioned, wherein varying the length of the blades is accomplished by movement of a floating blade seal arranged in a receiver formed by at least one of the blades along an outer diameter of the blade, wherein the receiver has one of (i) first and second surfaces that extend between a radially inner base and a radially outer apex and that converge from the base to the apex and (ii) an aperture that opens into the receiver from a flow path that extends into the blade.

19. A blade for a gas turbine engine comprising
a body including a root configured to engage a turbine rotor, an airfoil extending from the root, and a receiver positioned distally from the root, and
a floating blade seal received in the receiver such that centrifugal force applied to the floating blade seal during rotation of the blade about an axis of rotation causes the floating blade seal to move relative to the body and seat against the receiver to extend a radial height of the blade,
wherein the floating blade seal is free to move relative to the receiver and wherein the body defines a flow path extending from the root to the receiver, the flow path configured to direct a flow of gas through the body to impart the flow on the floating blade seal.

20. The blade of claim 19, wherein the floating blade seal has a base having a first width and at least two surfaces converging from the base, the width of the floating blade seal decreasing from the base to an apex to define a blade seal edge.

* * * * *